United States Patent [19]

Fäy et al.

[11] Patent Number: 5,321,982
[45] Date of Patent: Jun. 21, 1994

[54] METHOD FOR MEASURING THE RATE OF PENETRATION OF AN EQUIPMENT PROGRESSING IN A WELL

[75] Inventors: Hubert Fäy, L'Etang La Ville; Jean Clot, St Orens La Ville, both of France

[73] Assignee: Institut Francais Du Petrole, Rueil Malmaison Cedex, France

[21] Appl. No.: 917,085

[22] PCT Filed: Dec. 11, 1991

[86] PCT No.: PCT/FR91/01001
§ 371 Date: Oct. 5, 1992
§ 102(e) Date: Oct. 5, 1992

[87] PCT Pub. No.: WO92/10641
PCT Pub. Date: Jun. 25, 1992

[30] Foreign Application Priority Data

Dec. 12, 1990 [FR] France .................. 90 15657

[51] Int. Cl.⁵ .................. E21B 45/00; G01V 1/00; G01V 5/00
[52] U.S. Cl. .................. 73/151.5; 250/254; 250/262; 250/266; 250/267; 250/270; 364/422; 367/33
[58] Field of Search .................. 73/151.5; 367/33; 250/254, 262, 265–267, 269, 270; 364/422

[56] References Cited

U.S. PATENT DOCUMENTS

| | | | |
|---|---|---|---|
| 3,302,166 | 1/1967 | Zemanek, Jr. | 367/27 |
| 4,355,378 | 10/1982 | Dennis et al. | 367/33 |
| 4,597,067 | 6/1986 | Bockhorst et al. | 367/33 X |
| 4,610,005 | 9/1986 | Utasi | 367/33 |
| 4,662,209 | 5/1987 | Brown | 73/1 |
| 4,675,853 | 6/1987 | Bourgeouis et al. | 367/88 |
| 4,736,297 | 4/1988 | Le Jeune | 364/422 X |
| 4,901,289 | 2/1990 | Cretin et al. | 367/34 |
| 5,206,835 | 4/1993 | Beauducel | 367/21 |

FOREIGN PATENT DOCUMENTS 0197696 10/1986 European Pat. Off. .
2005865 4/1979 United Kingdom .

Primary Examiner—Robert J. Warden
Assistant Examiner—L. M. Crawford
Attorney, Agent, or Firm—Antonelli, Terry, Stout & Kraus

[57] ABSTRACT

The method comprises using a transmitting unit and at least two receiving units (8,10) arranged in two different places along well equipment (2). Each receiving unit forms an image or signature of wall portions which pass it. The signatures of wall portions formed by the lower receiving unit (8) when the well equipment is being lowered into the well are stored and the upper receiving unit (10) stores signatures coming from the wall portions which were previously stored by the lower receiving unit. A comparison (for example a correlation) of the signatures respectively coming from the two receiving units allows a common wall portion which has produced two substantially identical compared signatures to be identified. The time interval between the formation of the two substantially identical signatures is measured and the rate of penetration is calculated. As application of the invention is for the measurement of the true rate of penetration of a well tool or of a measuring sonde.

20 Claims, 2 Drawing Sheets

METHOD FOR MEASURING THE RATE OF PENETRATION OF AN EQUIPMENT PROGRESSING IN A WELL

BACKGROUND OF THE INVENTION

1. Field of the Invention

The present invention relates to a method and a device for measuring the true rate of penetration of an equipment progressing in a well. The invention can be applied in the petroleum field for determining the true rate of penetration of any well equipment, be it a drill bit or a measuring sonde for example. Knowing the true rate of penetration is of great importance for drillers, but also for geologists who need to know with precision the strata of the subsoil crossed through by a well.

2. Description of the Prior Art

Examples of the prior art in the field of determination of the measurement of the rate of penetration of a tool in a well are described in U.S. Pat. Nos. 2,688,871, 3,746,102 and 4,567,759, in European patent application EP-289,068 and in French patents 2,038,700 and 2,593,606, etc.

The rate of penetration of a tool in a well is often obtained indirectly through measurements performed at the surface. In the case of a drill bit, a standard method consists in measuring at the surface the rate of penetration into the ground of the string which supports the drill bit, as well as another parameter such as stress in the string or else, at the well bottom, the weight applied to the drill bit.

The results obtained with these type of methods are generally not very accurate. In fact, the string consists of more or less flexible drillpipes or tubes. It is therefore relatively elastic and the tension varies as a function of the length thereof. Consequently, corrections have to be introduced so as to take into account the length variations thereof, which are all the more considerable since the well is deep. The large friction between the string and the walls, as well as the influence of the different thrust loads exerted on the the equipment as a whole penetrating into the well should also be taken into account. Determining the rate of penetration therefore becomes very complex if all the factors which are likely to alter the values of the parameters introduced in the calculation are taken into account, insofar as they are known with precision.

Another method used with drilling operations consists of including in the equipment at the bottom of the hole several accelerometers for measuring the components of the acceleration of the equipment. The accelerations are integrated to obtain the rate of penetration according to the direction of the well. This method actually allows a direct measurement of the rate of penetration to be obtained. However, the implementing thereof is made difficult by the very large vibrations of the bit at the bottom of the hole, and also by the fact that the the signals provided by the accelerometers are subject to drift which if not compensated distorts the results.

SUMMARY OF THE INVENTION

Accordingly it is an object of the present invention to provide a method for measuring the true rate of displacement of an equipment in a well by avoiding the drawbacks mentioned above.

The method according to the invention thereto comprises the following steps :

the transmission of signals by transmitting means associated with the equipment;

the reception of the signals sent back by the wall of the, well by at least two receiving units associated with the equipment and disposed at different places along the well and at a determined distance from each other;

the storage of the signals respectively received by the two receiving units;

the recognition of the identical parts of the well wall which have sent back signals successively towards the two receiving units by comparing the stored signals received respectively by the two receiving units; and the measurement of the time interval between passage of the two receiving units in front of each wall portion recognized through the comparison, the rate of displacement of the equipment depending on said measured time interval.

The method preferably comprises the explicit determination of the rate of displacement as a function of the measured time interval.

The method comprises for example storing at least two sets of signals received respectively by said receiving units, representing each an image of a portion at least of the peripheral well wall; and the recognition of a single surface portion which has sent back signals successively towards the two receiving units by a correlation of the two corresponding images.

According to one embodiment, the signals of each set of signals are received simultaneously in several different radial directions.

According to another embodiment, the signals of each set may be received successively by scanning in several different radial directions.

The transmitted and received signals may be acoustic waves, electromagnetic waves or particle radiations.

The device according to the invention comprises :

transmitting means associated with the equipment displaced in the well for transmitting signals towards the wall of the well, at least two receiving units associated with the equipment for receiving the signals sent back by the wall of the well with the receiving units being arranged during operation at different depths of the well and at a determined distance from one another, means for storing the signals respectively received by the two receiving units, processing means allowing, by comparison of the stored signals identification of the portions of the well wall which have successively sent back signals towards the two receiving units, and computing means for measuring the time interval between the passage of the two receiving units in front of each wall portion identified through said comparison, and for computing therefrom the rate of displacement of the well equipment.

According to one embodiment, the transmitting means comprise a single transmitting unit.

According to another embodiment, the transmitting means comprise at least two transmitting units associated respectively with the receiving units and, in this case, transducers working at the same time during transmission and during reception may be used.

The transmitting means comprise for example a plurality of transmitters distributed on the periphery of the equipment displaced in the well.

Each receiving unit may also comprise a plurality of receivers distributed on the periphery of the equipment.

The transmitting means may comprise at least one rotating transducer irradiating the wall of the well by scanning.

Each one of the receiving units may also comprise at least one transducer receiving by scanning the signals received by the well wall.

Each receiving unit may comprise an acquisition chain for digitizing the received signals and the processing means may comprise means for picking up azimuth variations and means for correlating the stored signals.

The part of the assembly consisting of the storage means of the processing means and of the for determining the rate of penetration means may be located at the surface.

The device may comprise transmission means for linking the equipment to the surface.

BRIEF DESCRIPTION OF THE DRAWINGS

Other features and advantages of the method and the device according to the invention will be clear from reading the description hereafter of embodiments given by way of non limitative example, with reference to the accompanying drawings in which.

DESCRIPTION OF THE PREFERRED EMBODIMENTS

A tubular body 1 (FIG. 1) is interposed between equipment 2 lowered into a well 3. Linking means 4 links the latter to a surface installation I comprising a control gate C. When the equipment relates to the drilling of the well, the linking means 4 comprises a drill string or a flexible pipe. When the equipment is a measuring sonde, for example, the linking means 4 comprises for example an electrical cable.

Figure 2:
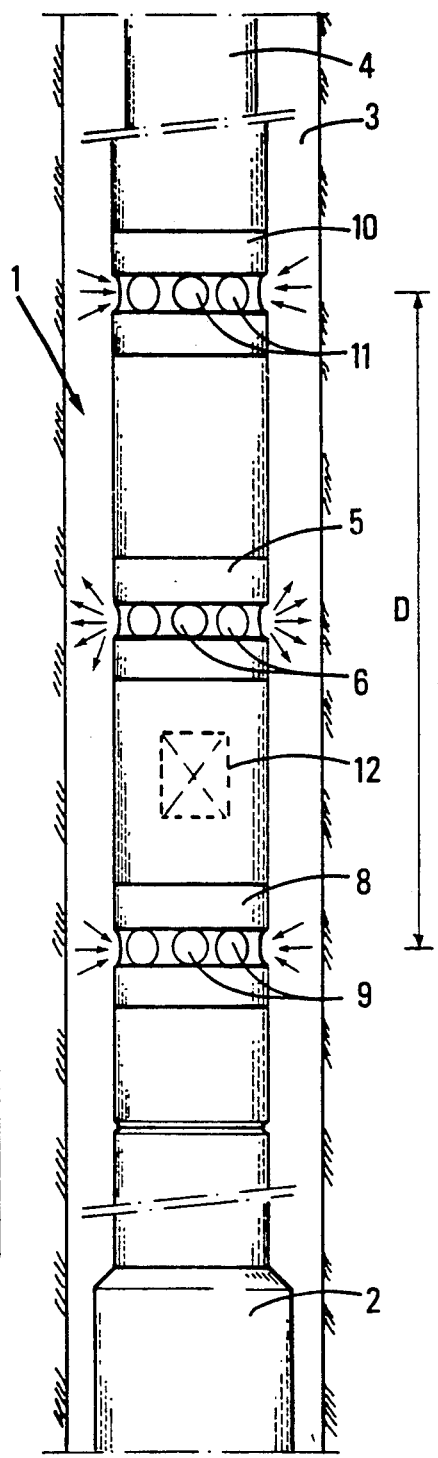
FIG. 2 diagrammatically shows an embodiment of the device according to the invention associated with an equipment displaced in a well.
Figure 3:
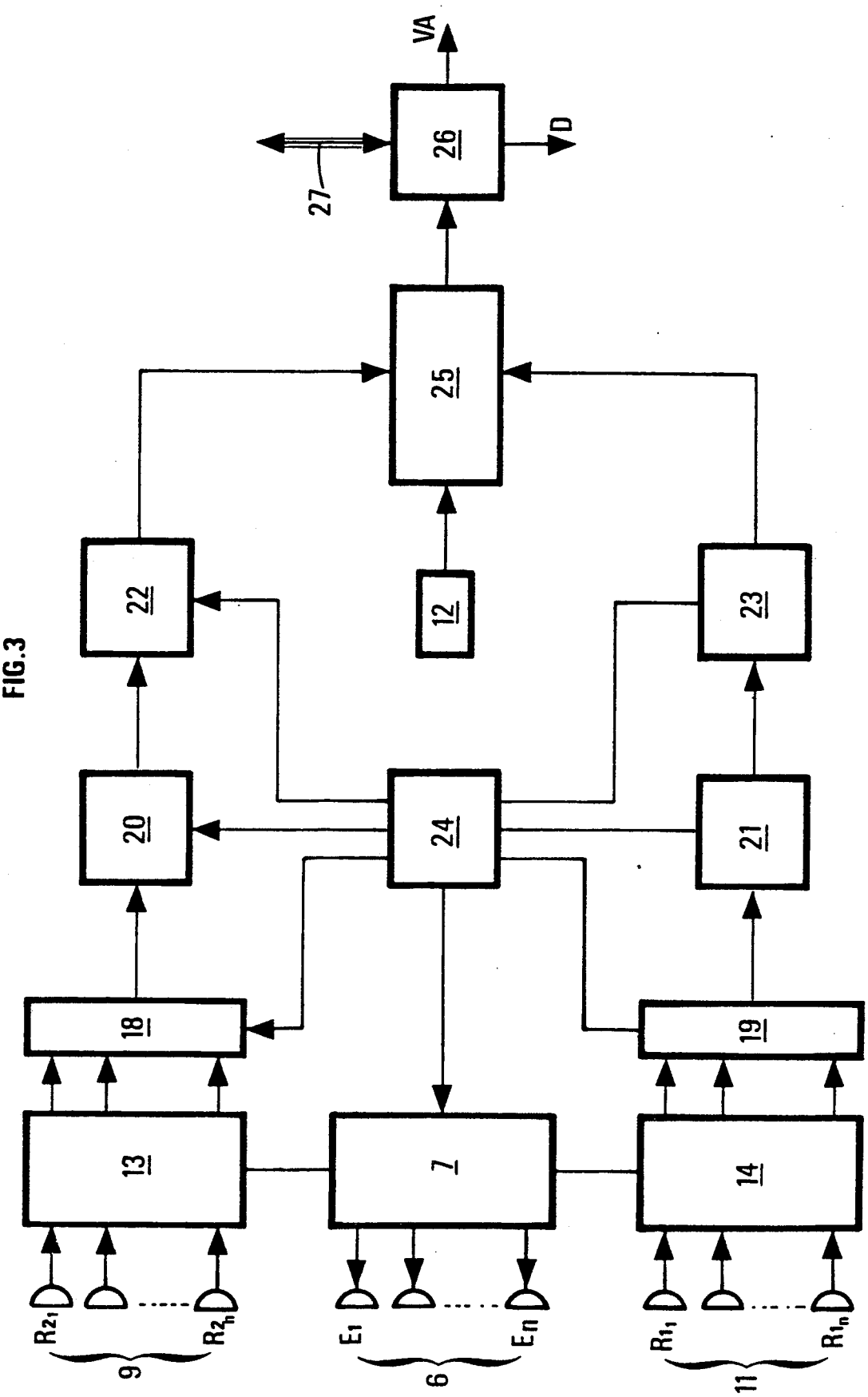
FIG. 3 is a diagram of the electronic equipment for determining the rate of penetration of the embodiment of FIG. 1.

Means 5 for transmitting signals are arranged inside body 1 illustrated in FIG. 2. In the embodiment as described, these transmitting means comprise for example a ring 6 of transducers E1, E2 . . . Ep of the ceramic type for example, arranged on the periphery of body 1 for transmitting acoustic signals towards various portions of the well wall, substantially at the same depth. The transmitting means 5 comprises a transmitting set 7 as illustrated in FIG. 3 for delivering to the transmitting transducers E1 to Ep signals at a relatively high frequency of the order of 1 MHz for example, which may be frequency or amplitude-modulated.

A first receiving unit 8, arranged in body 1, comprises a ring 9 of receiving transducers R21, R22 . . . R2n, which may also of the ceramic type for example, adapted for receiving the signals transmitted by transmitting means 5 and reflected back by the wall portion around the well.

A second receiving unit 10 analogous to the first unit 8 is arranged in the body at a place longitudinally displaced from the first unit 8. The longitudinal spacing between the two receiving units is known with accuracy. The two units are separated for example by ten cm or possibly more.

The second receiving unit 10 also comprises a ring 11 of receiving transducers R11, R12 . . . R1n adapted for receiving the signals transmitted by the transmitting means and reflected back by the wall of the well.

An azimuth sensor 12 is also arranged in body 1. It provides a signal representative of the angular variations of the body during the displacement thereof in well 3.

Transducers R21 to R2n and R11 to R1n of rings 9, 10 respectively are connected to two receiving sets 13, 14 illustrated in FIG. 3. Each one of these sets 13, 14 illustrated in FIG. 4 comprises a set of amplifiers 15a, 15b . . . 15n connected respectively to the receiving transducers R1, R2 . . . Rn, a set of demodulators 16a, 16b, 16n connected respectively to the outputs of the various amplifiers, and a set of filters 17a, 17B . . . 17n to which the demodulated signals are respectively applied. The signals coming from the various filters 17 of a single receiving unit 13, 14 are applied at the inputs of a multiplexer 18, 19.

Figure 4:
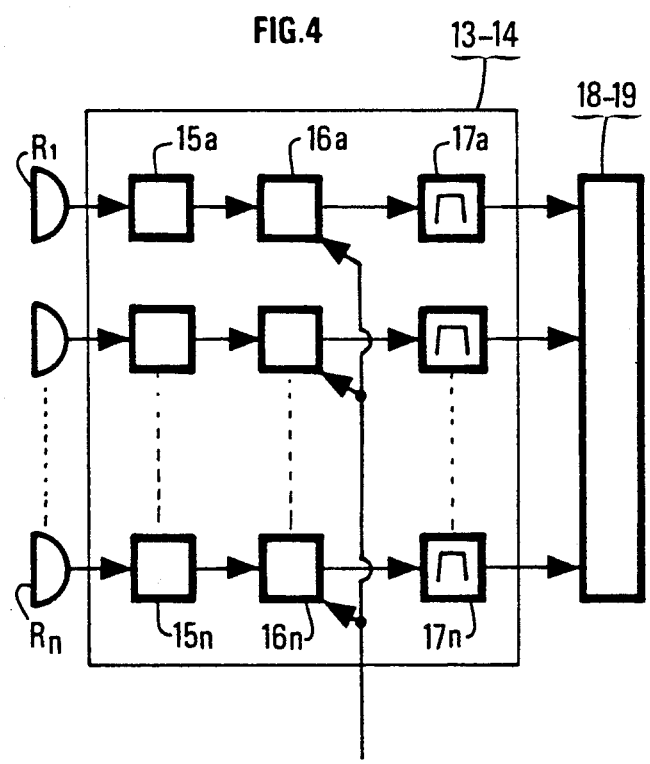
FIG. 4 is a diagram of a set for receiving the signals picked up by each receiving unit of the embodiment of FIG. 1.

With reference to FIG. 4, the signals coming from the multiplexers 18 and 19 are applied respectively to two analog to digital converters 20, 21. After the digitalization thereof, the respective signals from the analog to digital converters 20 and 21 are stored in storage units 22, 23. A control set 24 synchronizes the working of transmitting set 7, of multiplexers 18, 19, analog to digital converters 20, 21 and storage units 22, 23.

The device further comprises a comparison set 25 such as a correlator connected to the storage units 22, 23 and to azimuth sensor 12. A computing element 26 is connected to comparison set 25 for calculating the rate of displacement of the body.

Figure 1:
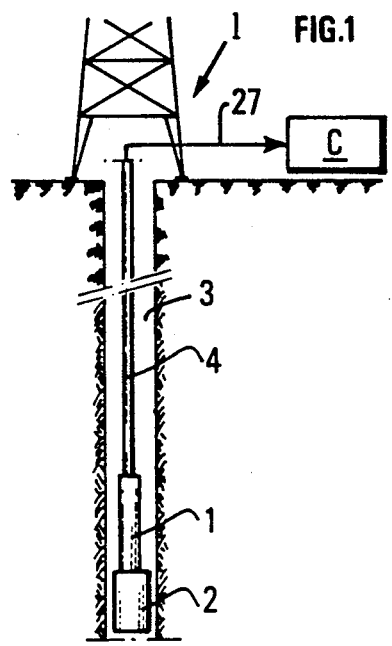
FIG. 1 diagrammatically shows a well equipment connected to a surface installation.

A transmission means such as a line 27 as illustrated in FIGS. 1, 3 allows the data measured at the bottom of the hole to be transmitted to the surface control set C. A link of a different type may be used through waves transmitted in the drilling mud by electromagnetic waves through the formation of else through the drill string, etc.

Calculation of the rate of displacement of body 1 is performed by calculating the time interval between the successive passage of the two receiving units 8 and 10 in front of the same portion of the well wall. Identification of these common wall portions is achieved by correlator 25 which compares two "images" or "signatures" stored respectively in storage units 22, 23 each consisting of signals received by the transducers of one of the receiving units 8, 10. Each image is representative of a wall portion on the periphery of the well, at the level of one of the rings 9, 11 of transducers. The images to be compared are adjusted in relation to one another by taking into account the possible azimuth variations detected by azimuth sensor 12.

If the body moves downwards for example into the well, the correlator compares every new wall image recently stored by unit 23 with the older images stored in the other storage unit 22. By scanning of the various images successively stored and contained in unit 22, the correlator identifies the substantially identical images corresponding to the same wall portion. An acquisition instant t1, t2 is associated with each image. The computing element 26 determines the rate of displacement or penetration from the known distance D between the two receiving sets 8, 10 and the time interval between the two instants t1 and t2.

If the displacement or penetration of the body in the well occurs in the opposite direction, comparison is of course achieved between the recently stored images in unit 22 and the older ones in the other storage unit 23.

For a given longitudinal spacing D between the two receiving units, the capacity of each storage unit 22, 23 is selected as a function of the repetition period of the signal transmission-reception cycles and of the rate of displacement of the equipment so as to be able to contain all the images of the intermediate well portion.

According to a second embodiment suitable for a well equipment turning round on itself in a sufficiently regular way during the displacement thereof, the device according to the invention may also comprise scanning reception means capable of acquiring sequentially acoustic images of the wall passing in front of one or several transducers rotating with the well equipment. Transmitting means rotating with the well equipment for irradiating the wall by scanning also may be used in this case.

According to a third embodiment, each ring receiving unit 9 and 11 such as described in connection with FIG. 2 may comprise transducers capable of working during transmission as well as during reception. In this case, the two transmitting-receiving units achieve separately the successive transmission, reception and signal acquisition cycles.

Images or signatures of the well wall may be formed by irradiating the latter with other types of waves without departing from the scope of the invention. The device may be adapted for example for transmitting and receiving an electromagnetic (X or gamma rays) or a particle radiation.

In the embodiments described, the images of the wall periphery are compared. Comparisons restricted to more limited portions of the well wall may of course be performed without departing from the scope of the invention.

Without departing from the scope of the invention, if a data transmission line of high output rate is provided, some operations for processing the signals picked up at the bottom of the hole by the receiving units may be transferred to control gate C at the surface (FIG. 1).

In the embodiment described, the signals received are filtered after demodulation. The order of the processing carried out on the signals received may be inverted without departing from the scope of the invention.

We claim:

1. A method of determining velocity of a well tool comprising moving along a well wall for each of successive portions of the well wall with a well tool; transmitting signals in a direction toward the well wall with a transmitter included with the well tool sensing the signals from the transmitter which are reflected from the well wall with at least two receivers included with the well tool and which are separated by a predetermined distance;

receiving and storing reflected signals which are first signatures of the portions with a first receiver when passing by the portions;

comparing the stored first and second signatures received by the first and second receivers until a substantially identical match between the first and second signatures of a portion is found;

determining a time interval between when the first and second receivers receiving the first and second signatures which are the substantially identical match; and using the predetermined distance between the first and second receivers and the determined time interval to determine the velocity of the well tool.

2. A method in accordance with the claim 1 wherein the comparing step comprises:

correlating the stored signals to identify identical first and second signatures for the portion.

3. A method in accordance with claim 1 wherein:

when receiving the reflected signals the first and second receivers simultaneously receive the reflected signals from a plurality of radial directions.

4. A method in accordance with claim 1 wherein:

when receiving the reflected signals the first and second receivers simultaneously receive the reflected signals from a plurality of radial directions.

5. A method in accordance with claim 1 wherein:

when receiving the reflected signals the first and second receivers successively receive the reflected signals from a plurality of radial directions.

6. A method in accordance with claim 2 wherein:

when receiving the reflected signals the first and second receivers successively receive the reflected signals from a plurality of radial directions.

7. A method in accordance with claim 1 wherein:

the received and transmitted signals are acoustic signals.

8. A method in accordance with claim 2 wherein:

the received and transmitted signals are acoustic signals.

9. A method in accordance with claim 3 wherein:

the received and transmitted signals are acoustic signals.

10. A method in accordance with claim 4 wherein:

the received and transmitted signals are acoustic signals.

11. A method in accordance with claim 5 wherein:

the received and transmitted signals are acoustic signals.

12. A method in accordance with claim 6 wherein:

the received and transmitted signals are acoustic signals.

13. A method in accordance with claim 4 wherein:

the received and transmitted signals are electromagnetic signals.

14. A method in accordance with claim 2 wherein:

the received and transmitted signals are electromagnetic signals.

15. A method in accordance with claim 3 wherein:

the received and transmitted signals are electromagnetic signals.

16. A method in accordance with claim 4 wherein:

the received and transmitted signals are electromagnetic signals.

17. A method in accordance with claim 5 wherein:

the received and transmitted signals are electromagnetic signals.

18. A method in accordance with claim 6 wherein:

the received and transmitted signals are electromagnetic signals.

19. A method in accordance with claim 1 wherein:

the received and transmitted signals are signals generated by radioactivity.

20. A method in accordance with claim 2 wherein:

the received and transmitted signals are signals generated by radioactivity.

* * * * *